US009751139B2

(12) United States Patent
Groth

(10) Patent No.: US 9,751,139 B2
(45) Date of Patent: Sep. 5, 2017

(54) POWER TOOL ASSEMBLY WITH INTEGRATED TOOL SUPPORT FIXTURE

(75) Inventor: Brady J. Groth, Shorewood, IL (US)

(73) Assignees: Robert Bosch Tool Corporation, Broadview, IL (US); Robert Bosch GmbH, Stuttgart (DE)

(*) Notice: Subject to any disclaimer, the term of this patent is extended or adjusted under 35 U.S.C. 154(b) by 1206 days.

(21) Appl. No.: 13/336,116

(22) Filed: Dec. 23, 2011

(65) Prior Publication Data

US 2013/0160630 A1 Jun. 27, 2013

(51) Int. Cl.
B23D 45/00 (2006.01)
B23D 45/02 (2006.01)
B23Q 9/00 (2006.01)
B27B 9/04 (2006.01)

(52) U.S. Cl.
CPC ......... B23D 45/006 (2013.01); B23D 45/021 (2013.01); B23Q 9/005 (2013.01); B23Q 9/0042 (2013.01); B27B 9/04 (2013.01); Y10T 83/667 (2015.04); Y10T 83/745 (2015.04); Y10T 83/7507 (2015.04); Y10T 83/8773 (2015.04)

(58) Field of Classification Search
CPC ...... B23D 45/006; B23D 47/02; B23D 45/02; B23D 45/021; B23D 45/022; B23Q 9/0014; B23Q 9/0042; B23Q 9/005; B23Q 9/0085; B23Q 17/2233; B25H 1/0057; B25H 1/0078; B26B 29/06; B27B 9/04; Y10T 83/667; Y10T 83/68; Y10T 83/8763; Y10T 83/75; Y10T 83/7507; Y10T 83/7513; Y10T 83/7587; Y10T 83/8773; B43L 7/12

USPC ...... 83/574, 745, 743, 454–456, 486.1, 581; 30/371–376; 33/465, 466, 477
See application file for complete search history.

(56) References Cited

U.S. PATENT DOCUMENTS

| | | | |
|---|---|---|---|
| 2,633,162 A * | 3/1953 | Neuenschwander ...... | 83/522.25 |
| 3,757,628 A | 9/1973 | Camacho | |
| 4,135,419 A | 1/1979 | Chapin | |
| 4,335,512 A * | 6/1982 | Sheps et al. ................... | 30/376 |
| 4,356,748 A | 11/1982 | Tilton | |
| 4,522,098 A | 6/1985 | Bliss | |
| 4,607,434 A | 8/1986 | Francis | |
| 4,608,898 A * | 9/1986 | Volk .............................. | 83/745 |
| 4,611,407 A * | 9/1986 | van Gorp ............... | B23Q 9/005 |
| | | | 33/471 |

(Continued)

OTHER PUBLICATIONS

Partial International Search in corresponding PCT application (i.e., PCT/US2012/071537), mailed Apr. 12, 2013 (7 pages).

Primary Examiner — Clark F Dexter
(74) Attorney, Agent, or Firm — Maginot Moore & Beck LLP

(57) ABSTRACT

A tool assembly is provided with an integrated support fixture and assemblies for orienting the tool at different angles relative to a workpiece. A guide rail assembly is provided that defines a travel path for the tool slidably supported thereon. The support fixture is configured to support the tool assembly on a workpiece so that gravity can assist movement of the tool across the workpiece. The guide rail assembly is mounted on a miter plate that can be oriented at different miter angles relative to the support fixture. The tool may be supported on the guide rail assembly to permit pivoting of the tool perpendicular to the miter angle. Another assembly may be provided that permits pivoting of the guided rail assembly at an orthogonal angle.

18 Claims, 16 Drawing Sheets

(56) References Cited

U.S. PATENT DOCUMENTS

| | | | |
|---|---|---|---|
| 4,751,865 A | 6/1988 | Buckalew | |
| 4,945,799 A | 8/1990 | Knetzer | |
| 6,868,612 B2* | 3/2005 | Ballard | 30/371 |
| 7,063,000 B2 | 6/2006 | Molburg | |
| 8,359,961 B2* | 1/2013 | Barnes | 83/574 |
| 2008/0034596 A1* | 2/2008 | Barnes | 30/373 |

* cited by examiner

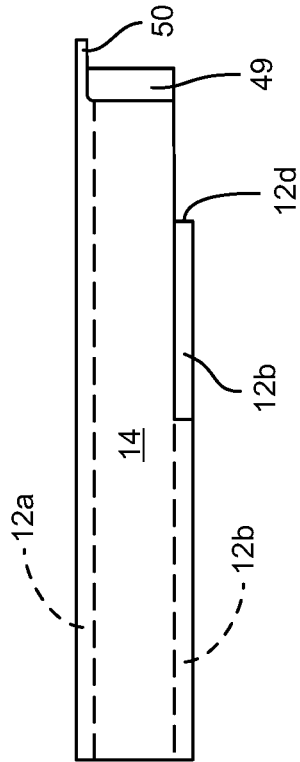
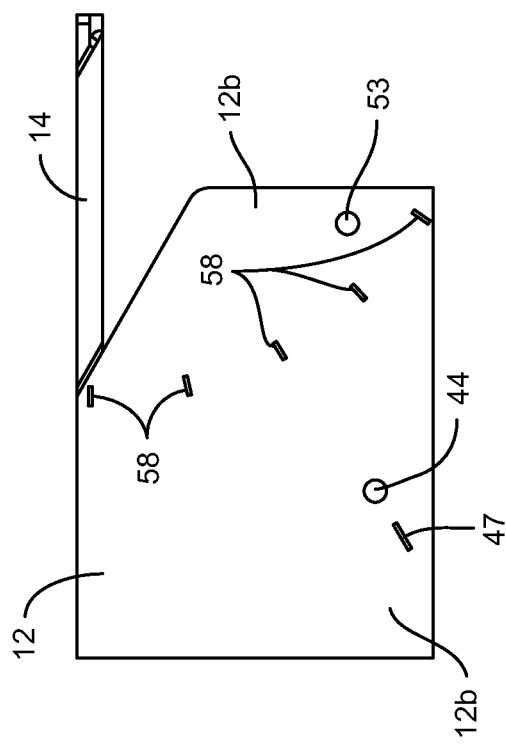
FIG. 5B
FIG. 5A

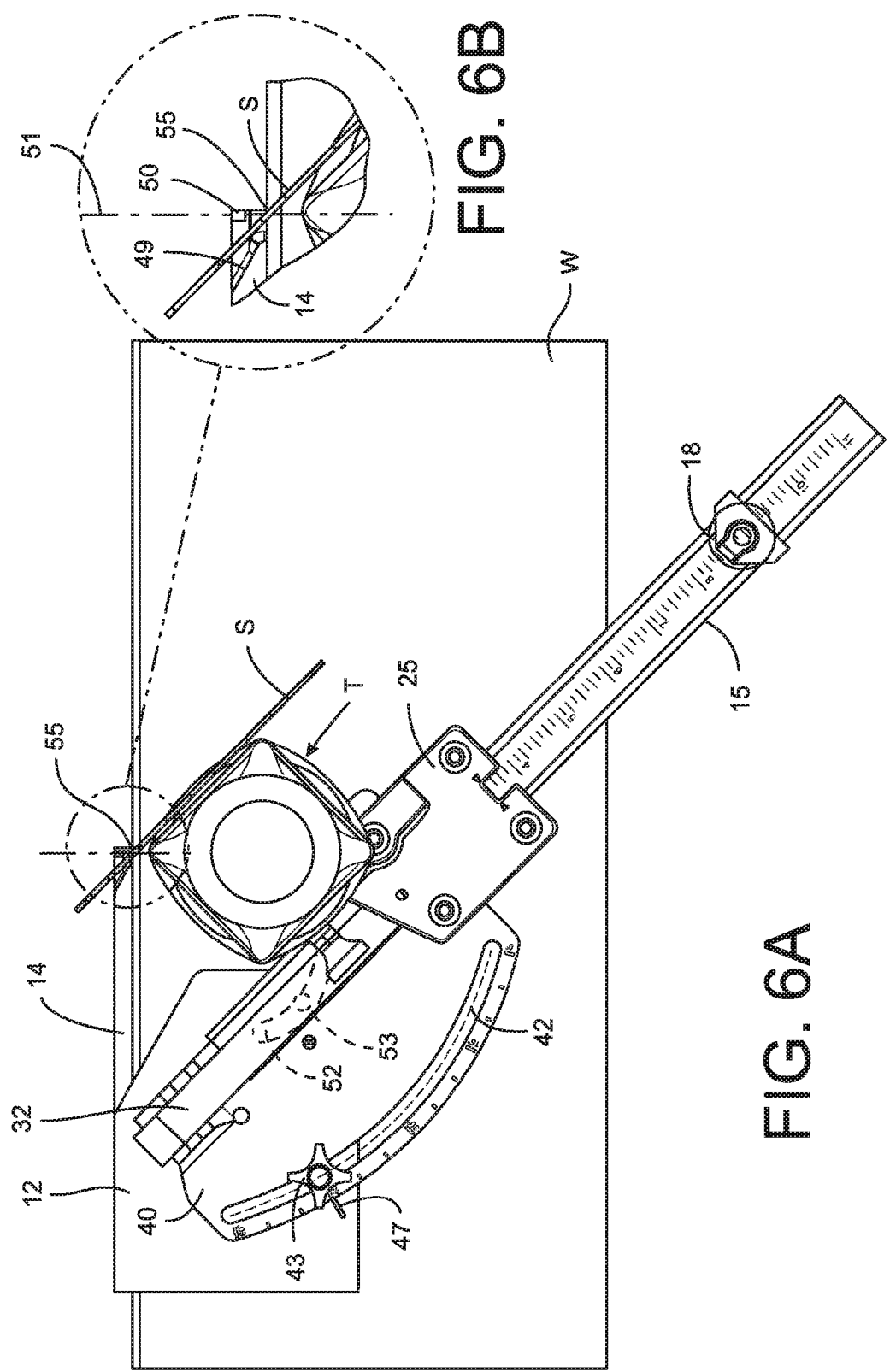

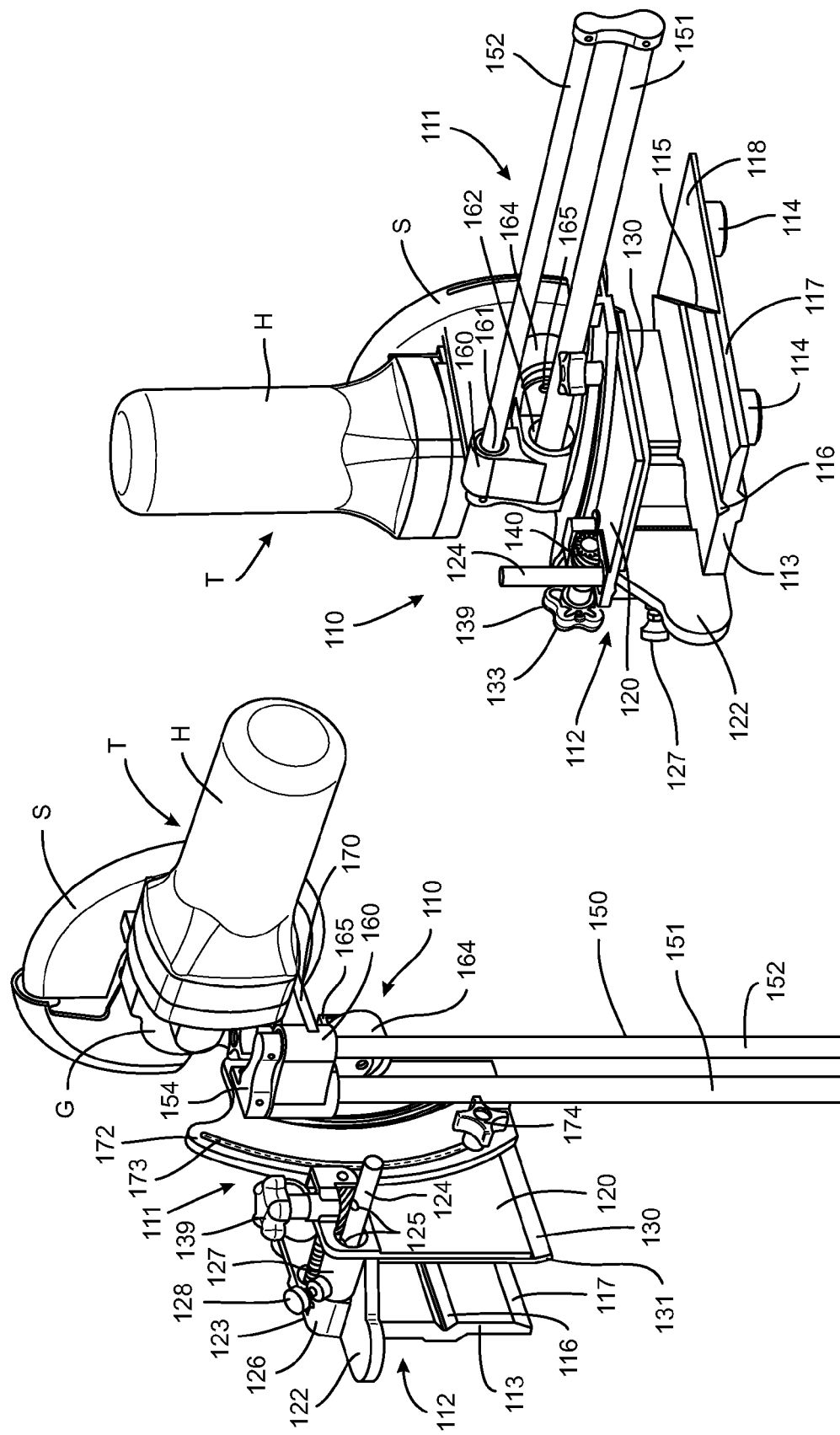

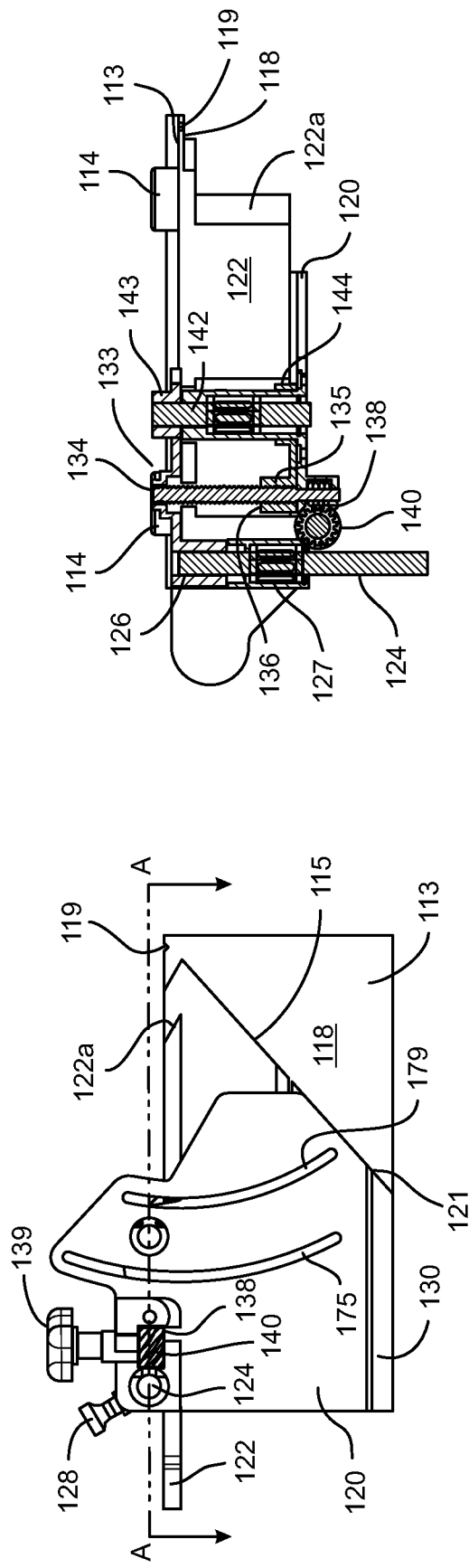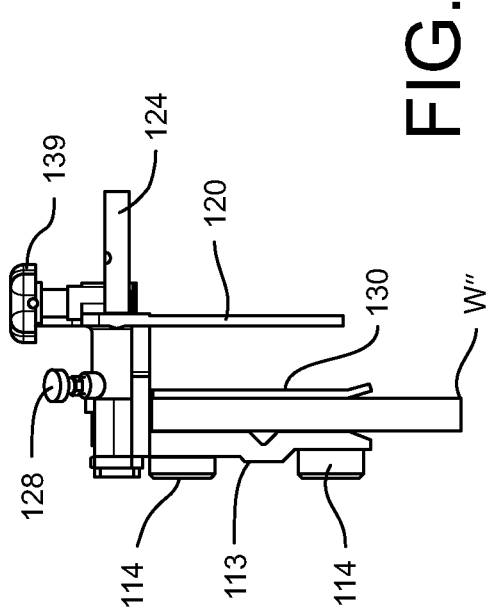
FIG. 16  FIG. 17  FIG. 18

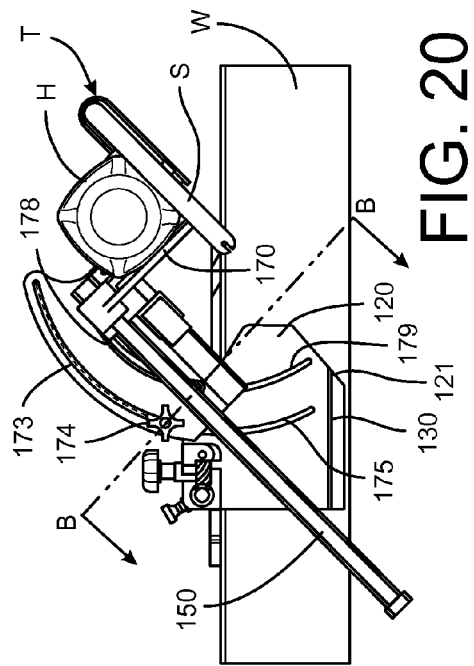
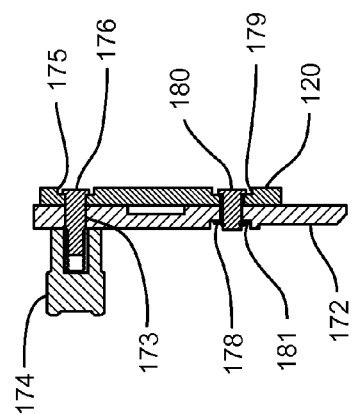
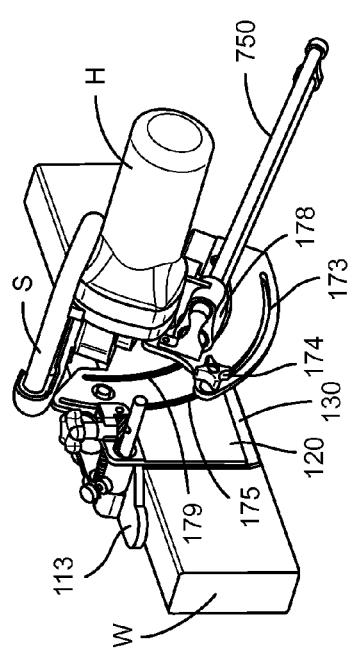
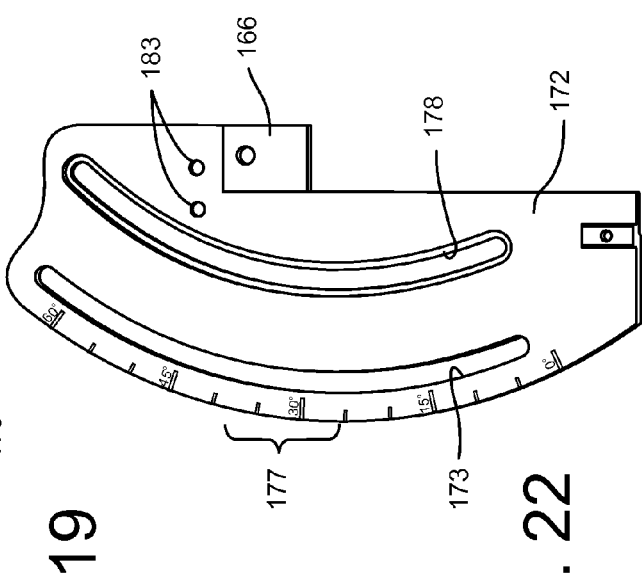

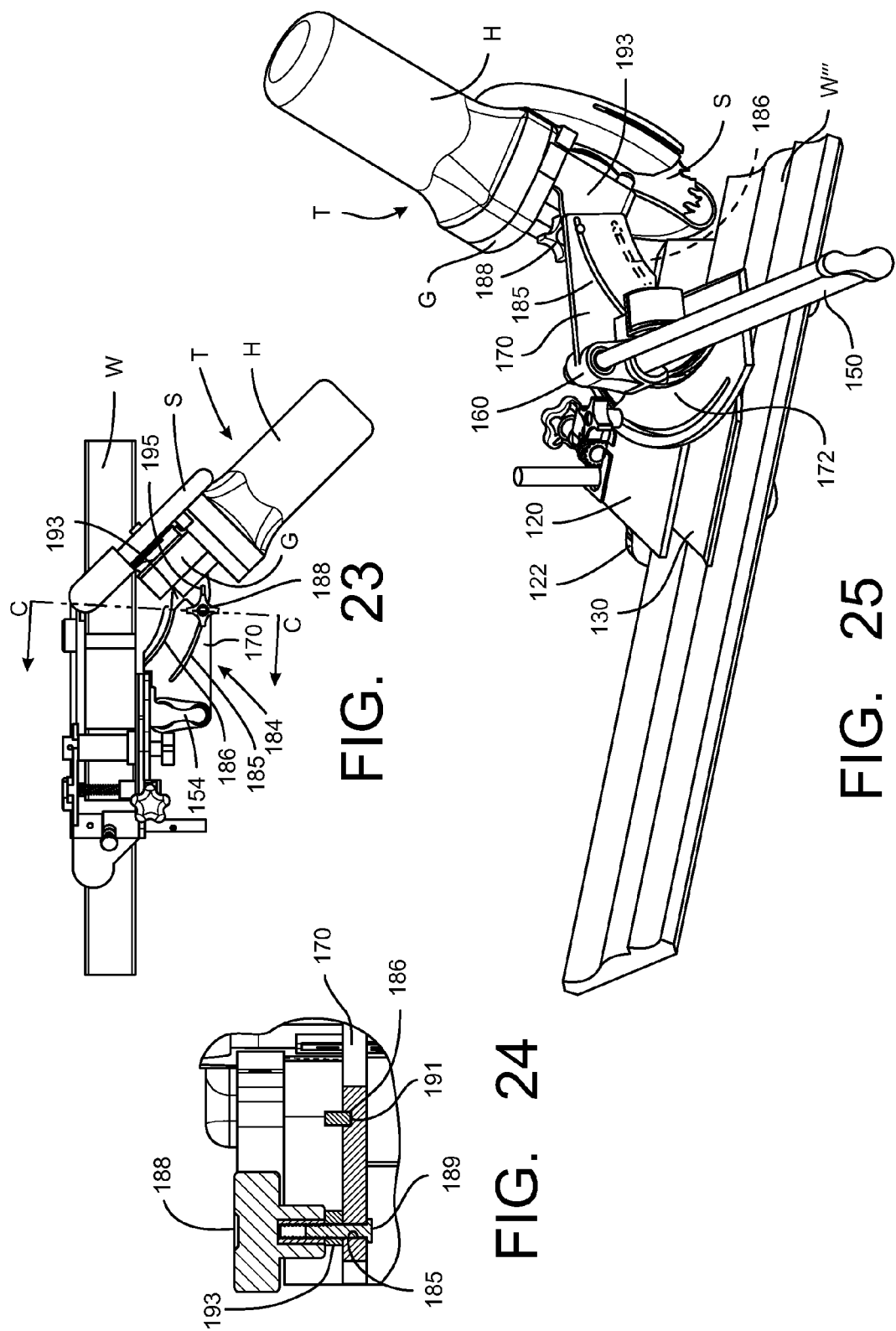

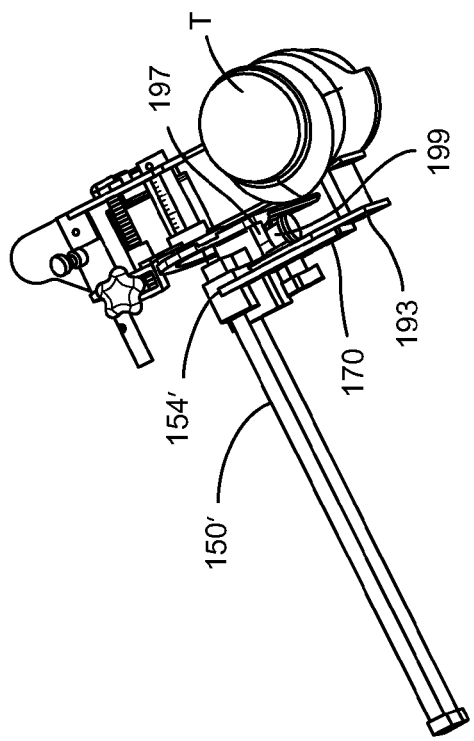
FIG. 26
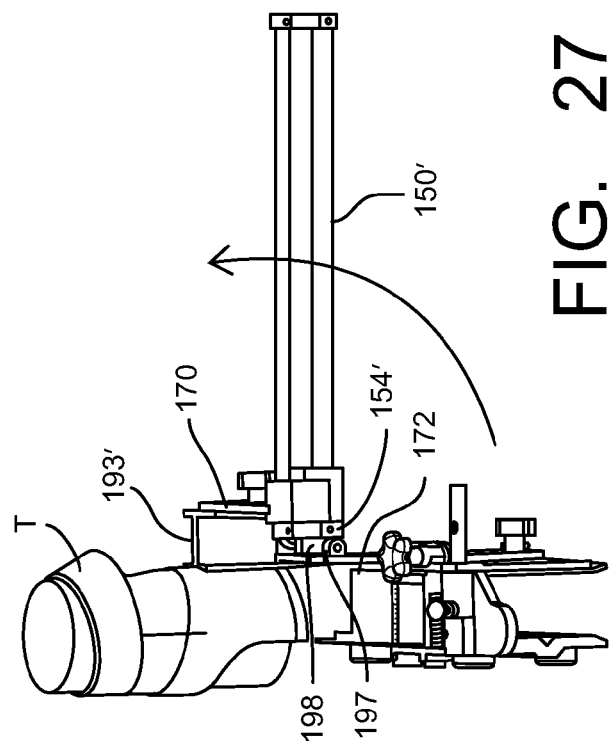
FIG. 27
FIG. 28
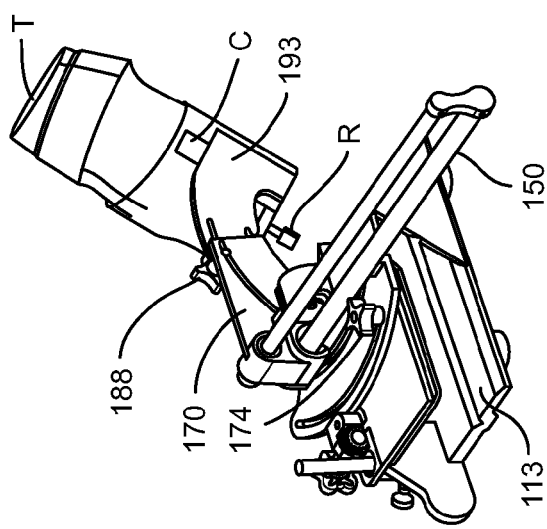

POWER TOOL ASSEMBLY WITH INTEGRATED TOOL SUPPORT FIXTURE

FIELD

The present disclosure relates generally to power tools and more particularly to an apparatus for supporting the power tool on a workpiece.

BACKGROUND

Power saws are useful for quickly and efficiently cutting a workpiece, such as construction lumber, molding and other items. A common type of power saw is a circular saw which, in the hand-held version, includes a saw housing provided with a handle and a foot plate that engages the workpiece to support the circular saw during a cut. In a typical hand-held circular saw, the user must carefully guide the saw along a cut line marking, or in some instances guide the foot plate along a straight edge supported on the workpiece. Needless to say this approach requires a great deal of skill to make an accurate and clean cut.

Circular saws are also often used to create mitered cuts, such as for creating various jointed surfaces in a workpiece. One particularly problematic joint cut is for contoured decorative molding, such as crown molding, which requires a compound angle cut. Even with various guide accessories, making the cut with a hand-held circular saw is difficult and cumbersome. Moreover, even positioning the saw for the cut can be time-consuming and frustrating to the home do-it-yourselfer and seasoned craftsman alike.

A system for facilitating the set-up and use of a hand-held power tool would be very beneficial for all construction projects.

SUMMARY

A power tool assembly is provided with an integrated support fixture and assemblies for orienting the tool at different angles relative to a workpiece. A guide rail assembly is provided that defines a travel path for the tool slidably supported thereon. The support fixture is configured to support the tool assembly on a workpiece so that gravity can assist movement of the tool across the workpiece. In one aspect, the guide rail assembly may be mounted on a miter plate that can be oriented at different miter angles relative to the support fixture. The tool may thus be supported on the guide rail assembly to permit pivoting of the tool perpendicular to the miter angle. The guide rail assembly may be provided with a retraction device fastened between a carriage for the tool and the support fixture to help retract the tool. The retraction device may be in the form of a coiled band having distance markings indicative of the distance of travel of the power tool Another assembly may be provided that permits pivoting of the guided rail assembly at an orthogonal angle to the miter angle. The support fixture may be configured to be supported on the workpiece in a vertical orientation for a gravity assist. The fixture may also be configured to support the workpiece in a horizontal orientation on a work surface so that the power tool can be used in the manner of a table saw, for instance.

DESCRIPTION OF THE FIGURES

The above-described features and advantages, as well as others, should become more readily apparent to those of ordinary skill in the art by reference to the following detailed description and the accompanying figures in which

FIG. 5a is a side view of a workpiece fence for use in the power tool assembly of FIG. 1.

FIG. 5b is a top view of the workpiece fence of FIG. 5b.

FIG. 6a is a side view of the power tool assembly of FIG. 1 supported on a workpiece and shown in a miter angle orientation.

FIG. 6b is an enlarged view of a cut line indicator of the power tool assembly shown in FIG. 6a.

FIG. 7 is a perspective view of the power tool assembly shown in FIG. 6a.

FIG. 8 is a top perspective view of the power tool assembly shown in FIG. 6a.

FIG. 11 is a front perspective view of a power tool assembly incorporating a tool support fixture according to another embodiment of the present disclosure in a first orientation.

FIG. 12 is a front perspective view of the power tool assembly of FIG. 11 shown in an alternative orientation.

FIG. 16 is a side view of components of the power tool assembly shown in FIG. 11.

FIG. 17 is a top cross-sectional view of the components shown in FIG. 16, taken along the section line A-A.

FIG. 18 is an end view of the components shown in FIG. 16 engaged to a workpiece.

FIG. 19 is a front perspective view of the power tool assembly shown in FIG. 13 with the assembly in a different angular orientation.

FIG. 20 is a side view of the power tool assembly shown in FIG. 13 with the assembly in another angular orientation.

FIG. 21 is a cross-sectional view of components in the power tool assembly shown in FIG. 20, taken along the section line B-B.

FIG. 22 is an enlarged view of a miter plate component of the power tool assembly shown in FIG. 11.

FIG. 23 is a top view of the power tool assembly shown in FIG. 13 with the assembly in a further angular orientation.

FIG. 24 is an enlarged cross-sectional view of components of the power tool assembly shown in FIG. 23, taken along section line C-C.

FIG. 25 is a top perspective view of the power tool assembly shown in FIG. 11 oriented to make a miter cut on a molding workpiece.

FIG. 26 is a side perspective view of a power tool assembly such as shown in FIG. 11 with a different power tool.

FIG. 27 is a top perspective view of a power tool assembly according to a further disclosed embodiment.

FIG. 28 is another top perspective view of the power tool assembly shown in FIG. 27.

DETAILED DESCRIPTION

Figure 1:
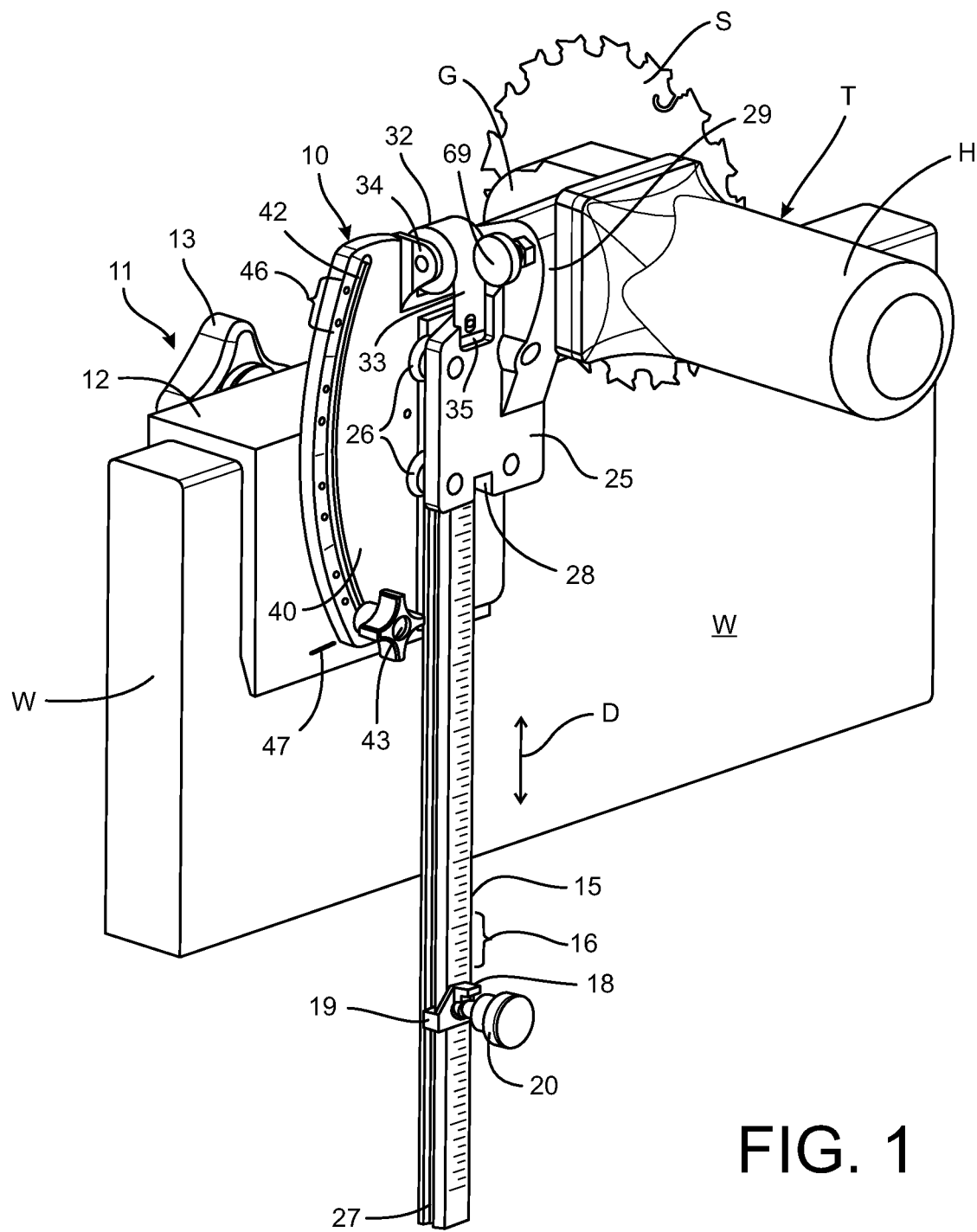
FIG. 1 is a front perspective view of a power tool assembly incorporating a tool support fixture according to one embodiment of the present disclosure supported on a workpiece.

For the purpose of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

Figure 2:
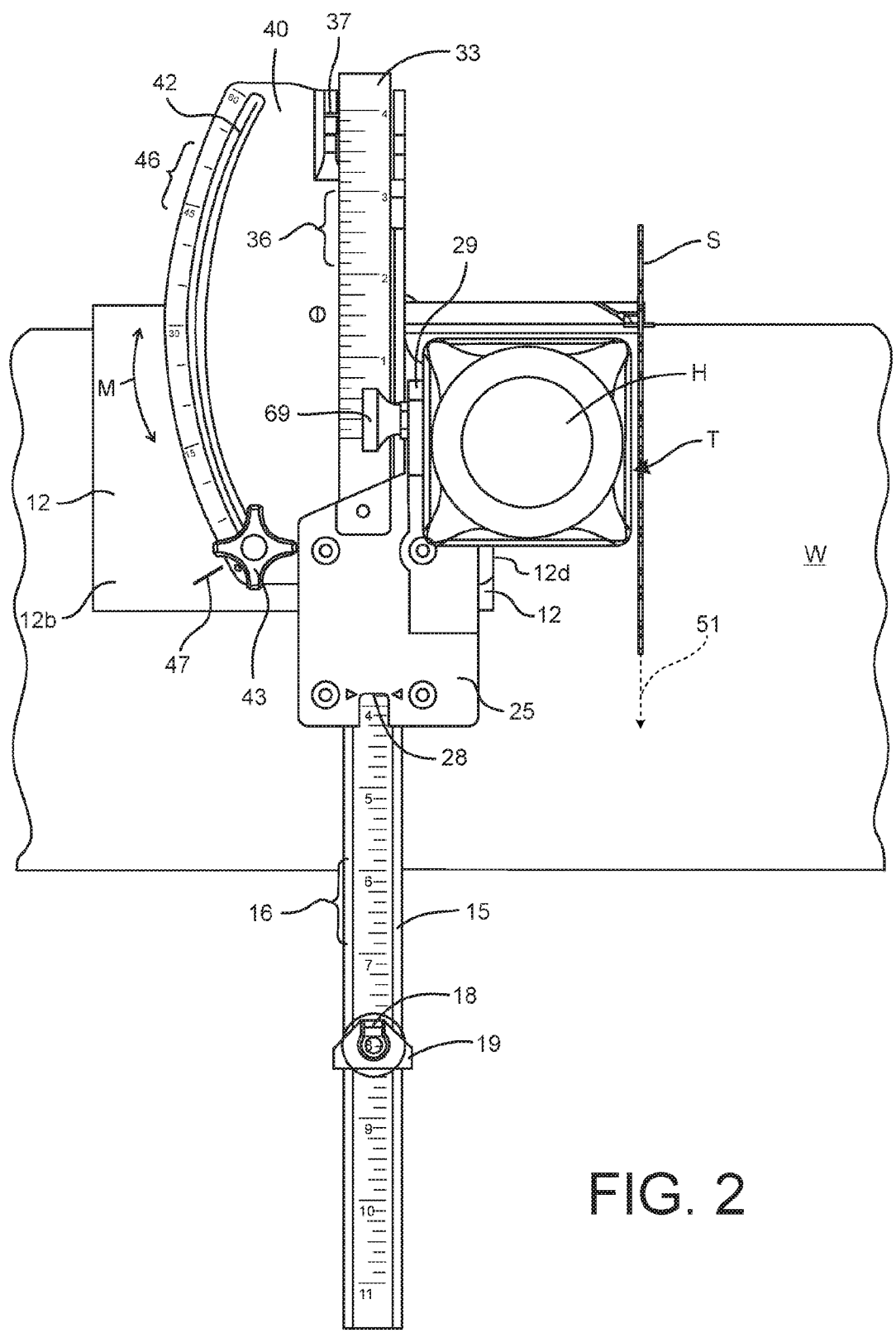
FIG. 2 is a front view of the power tool assembly of FIG. 1.
Figure 3:
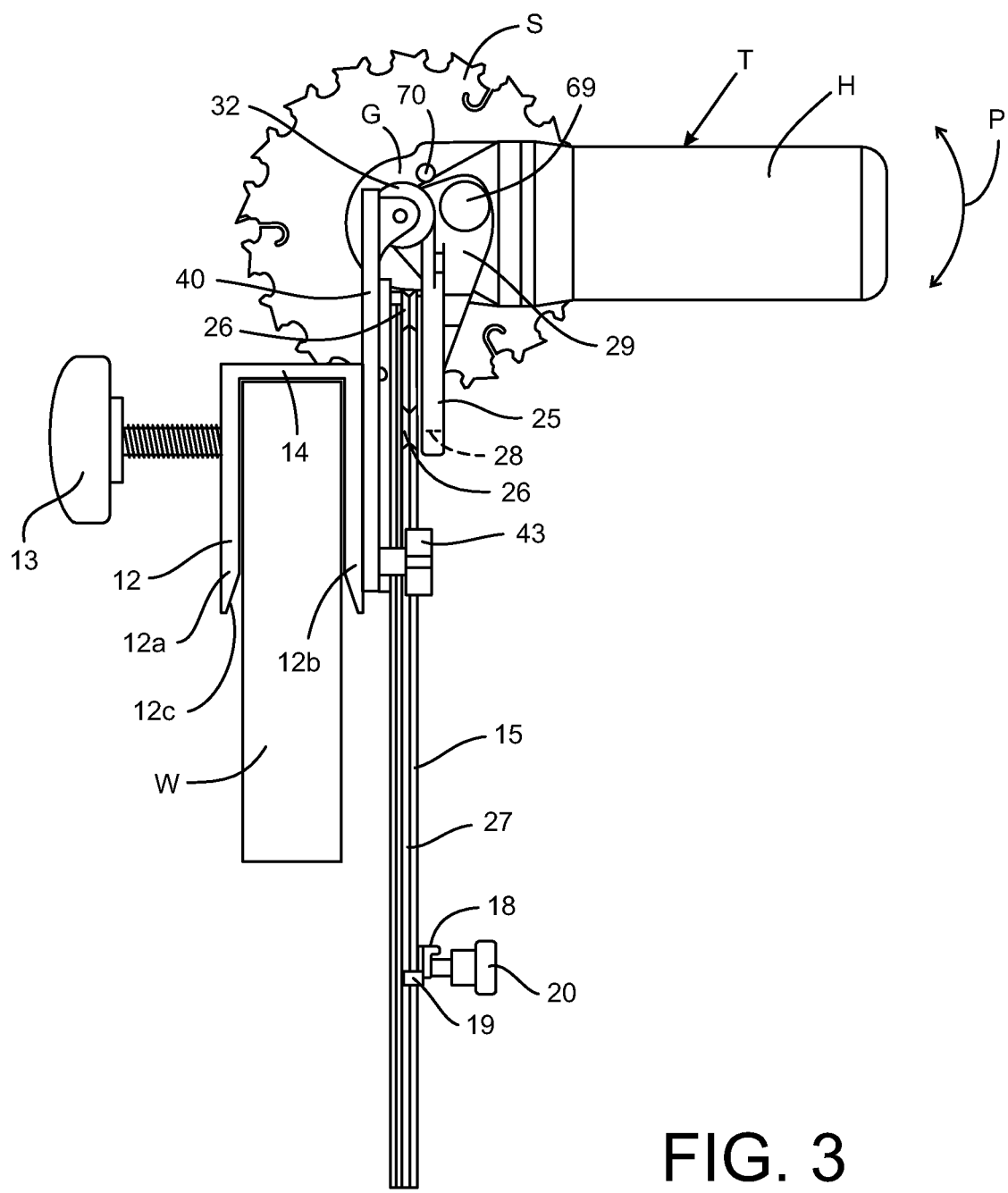
FIG. 3 is an end view of the power tool assembly of FIG. 1.

A power tool assembly 10 shown in FIGS. 1-3 includes a power tool T having a housing H containing the power components of the tool and configured to be manually grasped to operate the tool. In the illustrated embodiment the tool T is a circular saw having a rotating blade S powered through a gearbox G. Although the present disclosure relates to a circular saw, other manually operable power tools may benefit from the teachings of the present disclosure. For instance, the circular saw blade S may be replaced by a routing tool configured to make surface cuts in a workpiece. As shown in FIG. 3, the saw blade S may be sized to cut through the thickness of the workpiece W. Alternatively, the blade S may have a smaller diameter sized to cut only part way through the workpiece thickness.

Referring to FIG. 1, the power tool assembly 10 includes a support fixture 11 that is configured to support the power tool assembly directly on the workpiece W. The fixture is to be mounted on the workpiece without requiring the workpiece to be itself held within a separate fixture or clamp. In other words, it is known that in some cases users may support the workpiece with one hand while making a cut holding the power tool in the other hand. Thus, the fixture 11 disclosed herein is particularly suited to support the power tool on the workpiece in a manner that facilitates this two-handed procedure. The fixture 11 thus includes a clamping assembly or fence 12 that may be generally U-shaped, as shown in FIGS. 1 and 3 to conform to the perimeter of a typical workpiece, such as a 2×4 board. The fence 12 includes opposite arms 12a, 12b and a top plate 14 that generally form the U-shape. The arms 12, 12b may incorporate beveled ends 12c for easy mounting of the fence on a workpiece W. Moreover, the arms have a length sized to provide a stable foundation for supporting the tool assembly 10 on the workpiece. In one example, the arms 12a, 12b have a length that less than half the height of the workpiece W. In a more specific example, if the workpiece W is a 2×4, the arms may have a length of about 1½-2 in. The fence 12 is provided with a clamp 13 threaded into a through-bore in the fence to engage the workpiece and firmly clamp the workpiece within the fence. It is understood that other features or devices may be incorporated to ensure a firm engagement between the fence 12 and the workpiece W, including resilient features in the arms 12a, 12b themselves, provided that the fixture assembly 11 remains solidly seated on the workpiece during a cutting operation.

In one aspect, the tool support fixture 11 includes an elongated guide rail 15 mounted on the fence 12 that provides a path for the tool across the workpiece. In one embodiment, the guide rail may be mounted directly on the arm 12b of the fence, extending along the length of the arm. The guide rail is thus arranged to be perpendicular to the length of a workpiece W on which the fixture 11 is supported—i.e., parallel to the direction of a cross cut that would be made in the workpiece by the circular saw S. The guide rail is provided with gradations or markings 16 indicative of a linear distance along the guide rail. More particularly, the markings 16 are indicative of a depth of cut through the workpiece, as explained further below. The guide rail may be further provided with a stop 18 that is adjustably or slidably mounted on the guide rail to align with a particular one of the markings 16. The stop 18 is supported on a slide 19, as shown in FIG. 3, adapted to translate up and down along the guide rail. A locking knob 20 can be provided to lock the position of the stop relative to the guide rail.

The support fixture 11 further includes a carriage 25 that is mounted for translation along the length of the guide rail 15. It can be appreciate that the carriage 25 can translate downward along the guide rail until it reaches the stop 18. The carriage 25 is configured in one embodiment to engage the sides of the guide rail. Thus, in one embodiment, the guide rail 15 includes roller tracks 27 along the opposite sides of the rail, as seen in FIGS. 1 and 3. The carriage includes an arrangement of rollers 26 adapted to seat within the roller tracks 27 to support and hold the carriage on the guide track. The rollers 26 are supported on the carriage at a corresponding roller mount 26a (FIG. 9) so that the rollers do not interfere with the user's ability to see the markings 16 on the guide rail, and more particularly the relationship of the carriage to the markings. In order to facilitate the user's ability to accurately determine the position of the carriage, and therefore the depth of the cut into the workpiece W, the carriage may be provided with a viewing notch 28 through which the markings 16 can be readily seen.

Figure 9:
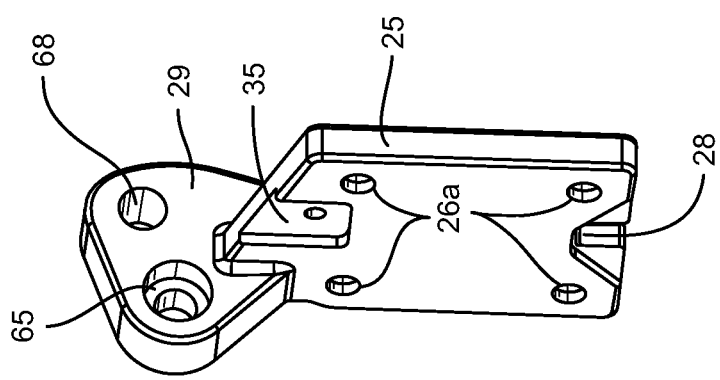
FIG. 9 is a perspective view of a carriage for use in the power tool assembly of FIG. 1.

The carriage 25 includes a tool mount 29 that is configured to support the tool T. In one embodiment, the tool mount 29 is a plate 29 arranged generally perpendicular to the carriage 25, as best shown in FIG. 9. As described in more detail herein, the tool mount 29 may include bores 65 and 68 used to attach the tool T to the carriage. The tool T is thus engaged to the carriage to move with the carriage along the guide rail 15. It can be appreciated that the guide rail thus provides a stable platform to guide the movement of the power tool T, and more importantly the saw blade S, across the workpiece W to perform a cut. The guide rail 15 is affixed to the fence 12 which is firmly mounted to the workpiece W. This allows the user to draw the tool T along a precise linear track to perform the cut in the workpiece by simply sliding the tool and carriage along the guide track. The user may use the housing H of the tool T as a handle to move the tool along the guide rail in the direction D (FIG. 1).

The tool assembly 10 and support fixture 11 as thus far described provides significant benefits to the user. First, the entire tool assembly, including the power tool T itself, can be easily mounted directly on a workpiece W by simply positioning the fence 12 on the workpiece as described above. The workpiece itself may be clamped to a work bench, may be directly held by the user, and may even be part of a building structure. In any of these cases, the position of the power tool relative the workpiece will not change once the fence 12 is clamped to the workpiece using clamp 13. The tool assembly can be easily clamped to the workpiece with the saw blade S accurately aligned with the desired cut location. In this respect, it can be seen that the guide rail 15 and carriage 25 are configured to support the tool T in an uppermost position in which the saw blade S is above the top edge of the workpiece, as depicted in FIGS. 1 and 3.

In FIG. 2 the tool T has been moved down the guide rail 15 toward the stop 18, so the blade S will have commenced a cut into the workpiece. This translation of the tool T may be assisted by gravity, in another beneficial attribute of the assembly 10. With the guide rail positioned vertically, as shown in FIGS. 1-3, gravity will automatically tend to pull the carriage 25 and tool T downward. The weight of the power tool T and support fixture 11 is thus a help, and not a hindrance, to the user. Unlike the standard hand-held tool, the user does not need to support the weight of the tool T of the present assembly. To the contrary, the user may need to apply additional downward force to push the saw blade S through the workpiece W. For softer wood, gravity alone may be enough to propel the saw blade through the workpiece until the carriage 25 reaches the stop 18.

Since the power tool T is affixed to a carriage that is supported on the guide rail 15, the tool will always be moved in a precise path defined by the guide rail. In the illustrated embodiment, the guide rail path is a linear path corresponding to a typical straight line cut through a workpiece. However, it is contemplated that the guide rail 15 may define cutting paths other than a linear path, depending upon the particular application. For instance, if the power tool is a router, the guide rail may define a non-linear path corresponding to a desired surface feature of the workpiece. Whether the cutting or tool path is linear or non-linear, the guide rail 15 of the present power tool assembly 10 ensures a straight and accurate cut. Moreover, since the user does not need to constantly scrutinize the direction of the cut to make sure that the cutting blade S is aligned with the cut line, the cut can be accomplished much more quickly. The gravity assist discussed above can further reduce the time it takes to complete a cut of any type in the workpiece.

A further difficulty in using typical hand-held tools is that it is difficult for the user to accurately judge the depth of a cut when a non-through cut is desired. The markings 16 and viewing notch 18 of the carriage 25 overcome this problem by providing the user with a readily visible and accurate indication of the actual depth of the tool blade within the workpiece. Moreover, the stop 18 prevents the saw blade from making a deeper cut than desired.

It can be appreciated that the tool assembly 10 as thus far described provides an easy way to make notch cuts in a workpiece. The fence may be fastened to the workpiece so that the saw blade S is aligned with the first side of the notch, and the cut performed to the desired depth of the notch, as identified by the location of the stop. The fence is then released from the workpiece and moved to the second location on the workpiece with the blade aligned with the cut line for the opposite side of the notch. Since the stop 18 is already in position, the cut can be quickly completed.

Figure 4:
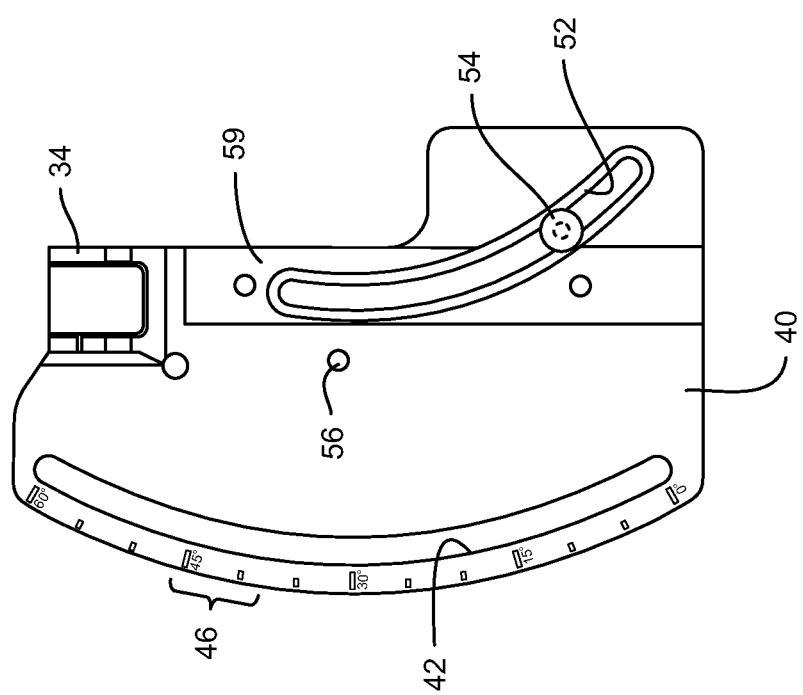
FIG. 4 is a front view of a miter plate for use in the power tool assembly of FIG. 1.
Figure 7:
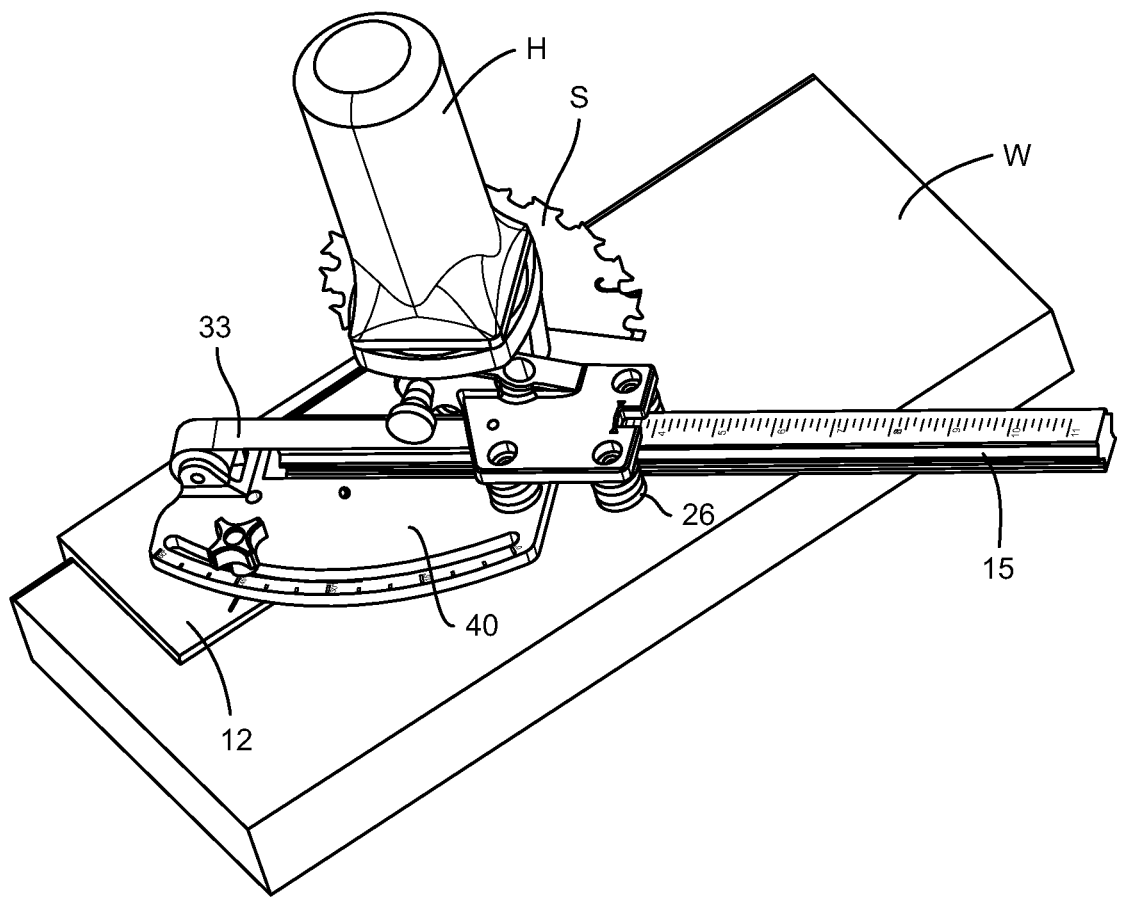

The tool assembly 10 and support fixture 11 may further incorporate the ability to orient the tool at an angle relative to the workpiece. In one aspect, the support fixture 11 includes a miter plate 40 that is pivotably supported on the fence 12, such as on arm 12*b*. The miter plate is supported for pivoting in a plane parallel to the workpiece W, as represented by the direction arrows M in FIG. 2. The guide rail 15 is fastened to the miter plate 40 (such as at location 59 in FIG. 4) so that the guide rail pivots with the plate. Moreover, since the tool T is supported on the guide rail via the carriage 25, the tool T is also pivotable relative to the fence 12 and workpiece W. As shown in FIG. 4, the miter plate 40 includes a pair of curved slots 42 and 52. A locking knob 43 passes through the slot 42 to engage a bore 44 in the arm 12*b* of fence 12 (FIG. 5*a*). The locking knob can be loosened and tightened by the user to allow pivoting of the miter plate 40 along the curved slot 42. The miter plate includes an angle scale 46 adjacent the curved slot 42 that can be used to set the miter plate at a particular angle relative to an indicator hash mark 47 defined on the fence 12, as shown best in FIG. 2. In order to ensure that the cutting blade S is always centered on the desired cut line and that the blade cutting depth is correct for every miter angle, the support fixture 11 incorporates a virtual miter pivot formed by the interaction of the first curved slot 42 and the second curved slot 52. A fixed pivot pin 54 extends through the second slot 52 to engage a bore 53 in the arm 12*b* of the fence 12. The pivot pin 54 is regarded as fixed because it cannot be loosened and tightened by the user. Instead, the pivot pin 54 is concealed behind the guide rail 15 for most movements of the miter plate 40. However, it is understood that the pivot pin 54 translates within the slot 52 as the miter plate is pivoted. It can be appreciated that the locations of the pivot pin 54 and the locking knob 43 are fixed relative to the fence, being dictated by the location of the corresponding mating bores 53 and 44.

Figure 8:
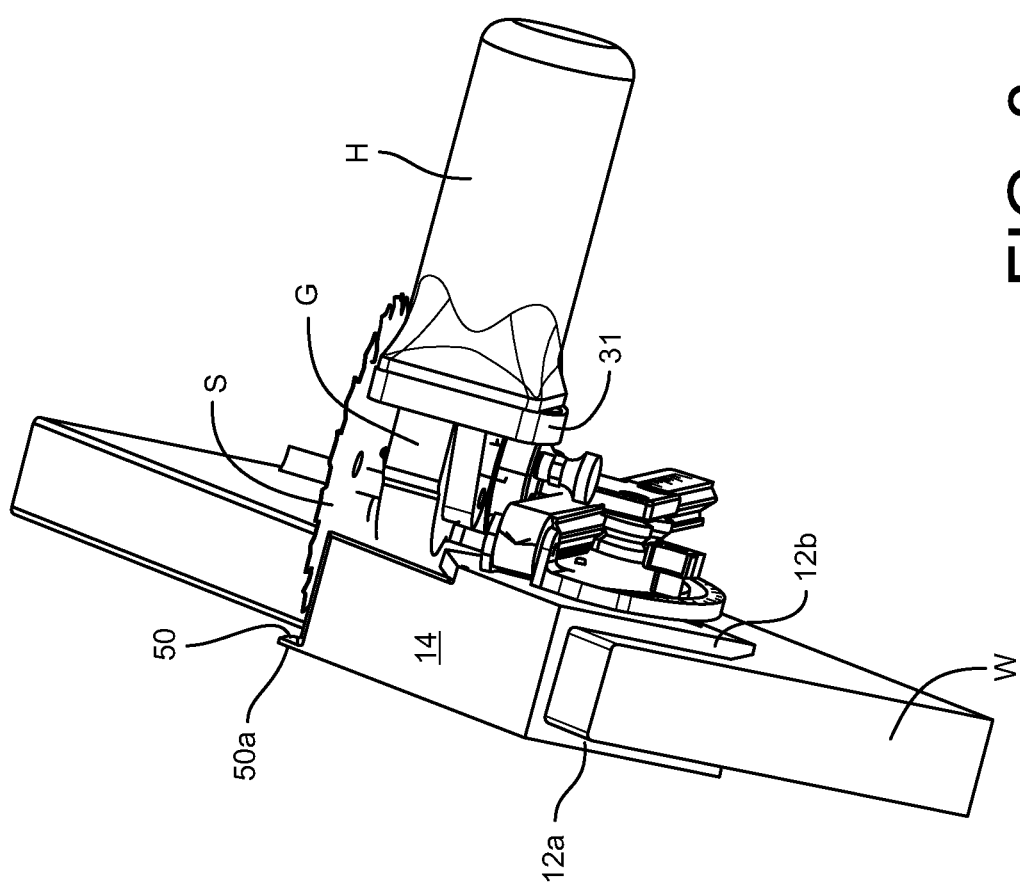

The tool T can be pivoted to a particular miter angle relative to the workpiece W by first loosening the locking knob 43. The miter plate 40 is moved relative to the locking knob 43 with the locking knob loosely fastened to the bore 44 in the fence 12. Once a desired angle on the scale 16 is aligned with the hash mark 47, as shown in FIG. 6*a*, the locking knob can be tightened to clamp the miter plate to the arm 12*b* of the fence 12. As the miter plate is moved, not only does the locking knob 43 translate relative to the slot 42, but the pivot pin 54 also translates relate to the slot 52 hidden behind the guide rail 15. This combined movement thus rotates the saw blade S about a virtual pivot point 55 shown in FIG. 6*a* and in the enlarged detailed view of FIG. 6*b*. This virtual pivot point 55 corresponds to the intersection of the path of the saw blade with the upper edge of the workpiece when the workpiece is engaged by the support fixture 11. Regardless of the miter angle dialed in at the angle scale 46, the saw blade S and its travel path will always pass through the virtual pivot point 55. This virtual pivot point 55 is aligned with the imaginary cut line 51 that is indicated by the line of cut indicator 50 formed in the top plate 14 of the fence 12, as shown in the detailed view of FIG. 6*b*. Since the line of cut indicator is intentionally aligned with the saw blade path, the arm 12*a* of the fence 12 can have a reduced thickness at portion 50*a*, as shown in FIG. 8, so that the blade S does not contact the fence at the line of cut indicator 50.

The top plate 14 further defines a beveled end edge 49 that accommodates the saw blade S at the achievable range of miter angles. As shown in FIG. 6*b*, the end edge 49 of the top plate 14 is offset from the line of cut indicator 50. This offset allows the user to visually line up a cut line drawn on the top of the workpiece W with the line of cut indicator. In addition, the edge 12*d* (FIG. 5*b*) of the arm 12*b* of the fence 12 is offset or shorter than the top plate 14 to provide visibility to a cut line drawn along the side of the workpiece.

Referring to FIG. 5*a*, the arm 12*b* may be provided with miter position setting grooves 58 defined at predetermined angular intervals. The grooves are configured to be engaged by a detent 56 mounted in the miter plate 40 (FIG. 4). The detent may be a ball end pin threaded into a bore in the miter plate, or may be a dimple formed in the back side of the plate facing the fence 12. The detent 56 is configured to provide an audible and/or tactile indication when the detent passes into a setting groove 58. The grooves may be set at common miter angles, with the uppermost groove corresponding to a zero angle (a perpendicular cut) and the ensuing grooves set at 15° intervals, to provide miter angles of 15, 30, 45 and 60 degrees in the illustrated embodiment.

As shown in FIG. 6a, the miter plate 40 allows the user to orient the saw blade S at a desired miter angle and secure the benefits of the guide rail 15 described above. In particular, even at the different angle, the guide rail 15 provides a secure path for the travel of the tool T and cutting blade S as the carriage 25 is translated along the guide rail. Even at this angle, gravity will still assist movement of the saw blade through the workpiece. Alternatively, the user can hold the workpiece so that the guide rail is vertically aligned relative to the ground, thereby maximizing the gravity assist. The orientation of the tool assembly in FIG. 6a further illustrates one aspect about the guide rail, namely that it has a length necessary to accommodate the angled cut. It can be appreciated that the length of a through cut of the workpiece is greater if the cut is made at an angle. Thus, while a shorter guide rail 15 may be appropriate for a perpendicular cut, as shown in FIG. 2, the angled cut of FIG. 6a requires the saw blade S, and therefore the carriage 25, to travel a longer distance.

In order to further simplify the operation of the tool assembly 10, the support fixture 11 may be provided with a return mechanism 32. The mechanism includes a coiled flexible band 33 connected at one end to the miter plate 40 and at the opposite end to the carriage 25, as shown in FIGS. 1, 2. The band may be connected to the miter plate at a retraction mount 34 that is configured to wind and unwind the band, like a spool. The retraction mount may be provided with a torsion spring or equivalent component to bias the retraction mount to the fully wound configuration shown in FIG. 1. When the carriage 25 is moved to the position shown in FIG. 2, the flexible band 33 uncoils from the retraction mount. The band may be fastened to the carriage at an embedded mount 35 (FIG. 9). The return mechanism 32 thus provides a force to help pull the carriage up the guide rail 15. In one embodiment the return mechanism can be configured and calibrated to neutralize the force of gravity so that the carriage and tool T essentially "float" on the guide rail. Alternatively, the return mechanism can be configured to generate a force sufficient to overcome the force of gravity to restore the carriage to its original position.

The band 33 may be provided with depth of cut markings 36 that parallel the markings 16 on the guided rail. An indicator 37 may be provided on the retraction mount 34, as shown in FIG. 2, so that the user has a clear indication of the distance that the blade S has traveled into the workpiece.

Figure 10:
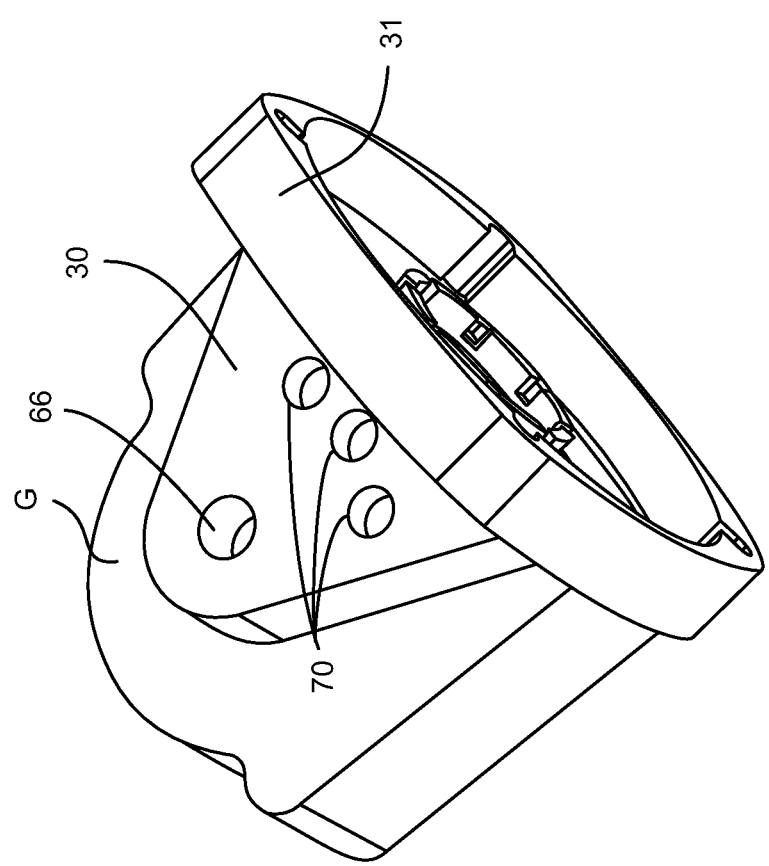
FIG. 10 is a perspective view of a tool mount for use in the power tool assembly of FIG. 1.

As previously described, the support fixture 11 includes a tool mount 29 on the carriage 25 to which the tool T is attached. In one aspect, the tool mount is configured to interface with the gearbox G of the tool. As shown in FIG. 10, the gearbox G includes a housing mount 31 for engaging the housing H of the tool T. The gearbox is configured to transmit the power generated by the motor contained within the housing H to rotation of the saw blade S about an axis passing though bore 66 in the tool mounting bracket 30 that interfaces with the tool mount 29. The bore 66 is aligned with the pivot bore 65 defined in the tool mount 29 (FIG. 9) and is configured to receive a mounting bolt (not shown). The mounting bolt thus connects the mounting bracket 30 to the tool mount 29, while also permitting relative pivoting between the two components. This relative pivoting allows the user to pivot the housing H in the direction P shown in FIG. 3. It is understood that this pivoting movement does not change the axis of rotation of the saw blade S and thus does not affect the cutting operation of the tool. However, the pivoting movement allows the user to move the housing H to a more comfortable position to use the housing as a handle to perform the cut. In one embodiment, the mounting bracket 30 includes a series of locking bores 70 spaced apart at predetermined angular intervals. The locking bores receive a locking knob 69 that passes through bore 68 in the tool mount 29. The locking knob 69 may be retracted to permit pivoting of the tool T relative to the tool mount 29, and then extended into a particular locking bore 70 when the desired angular orientation is reached. In one embodiment, three locking bores are provided to permit positioning of the housing H in a horizontal orientation, as shown in FIG. 3, and articulated upward or downward by 15 degrees. Of course, other angular orientations may be incorporated into the tool mount 29 and mounting bracket 30. This articulating feature can be used to make the tool assembly more ergonomic for the particular user. Moreover, in certain instances it may be desirable to reposition the housing H for clearance relative to structure surrounding the workpiece. For instance, in one application the tool assembly 10 is mounted on a beam in a building structure where it is desired to make a notch cut. The proximity of other beams or structure may prevent access for the tool with the housing in the perpendicular position shown in FIG. 3, whereas tilting the housing up or down may allow the tool to clear the surrounding structure.

Figure 14:
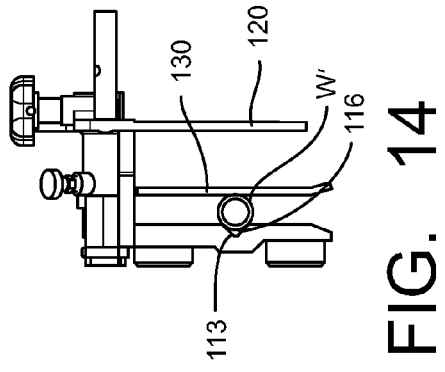
FIG. 14 is an end view of the power tool assembly shown in FIG. 11 engaging a different workpiece.
Figure 13:
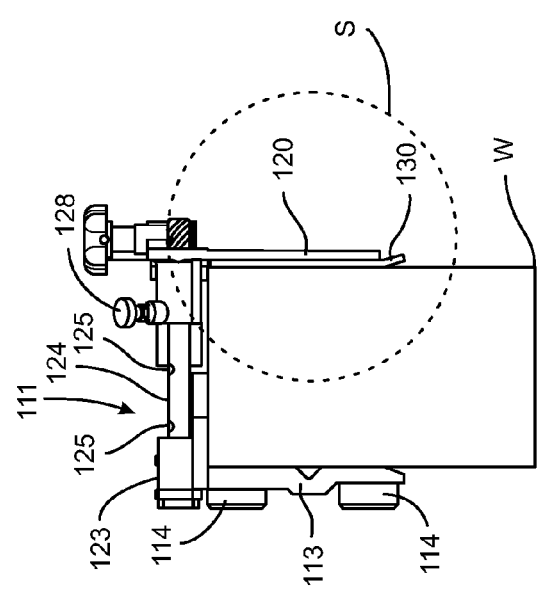
FIG. 13 is an end view of the power tool assembly shown in FIG. 11 supported on a workpiece.
Figure 15:
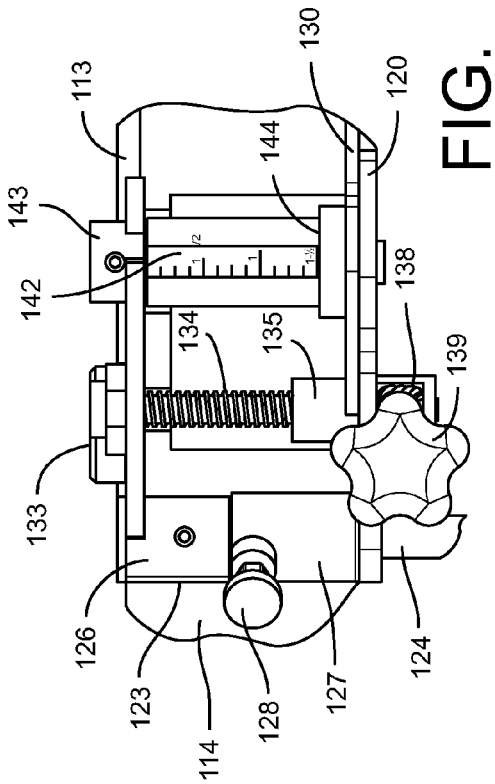
FIG. 15 is a top view of a portion of the power tool assembly shown in FIG. 13.

A power tool assembly 100 shown in FIGS. 11-25 includes an alternative embodiment of a support fixture 111. The support fixture 111 includes a clamping or fence assembly 112 having a base plate 113 and fixed plate 120 spaced apart a distance sufficient to receive a workpiece, as depicted in FIG. 13. The support fixture 111 is configured to support the tool assembly 110 on a workpiece in a manner similar to the support fixture 11 described above. The base plate 113 may include feet 114 so that the tool assembly 110 can be free-standing on a work bench, as shown in FIG. 12. As shown in FIG. 16, the base plate 113 may incorporate a miter angle relief 115 to accommodate different angular orientations of the working tool, such as saw blade S. The base plate may further include a beveled edge 117 to facilitate placement of the support fixture 111 on a workpiece, such as the workpiece W in FIG. 13. As shown in FIGS. 12 and 16, the base plate 113 may further include a reduced thickness portion 118 that extends beyond the miter angle relief 115. The reduced thickness portion provides clearance for the saw blade S while retaining a platform for the feet 114. The reduced thickness portion 118 also provides a surface for the cutline indicator 119 (FIG. 16) so that the indicator can be directly aligned with a cut line marked on the workpiece. In certain embodiments the base plate may incorporate a workpiece notch 116 that can be used to clamp a tubular workpiece such as the tube W' shown in FIG. 14.

The support fixture 111 further includes a top plate 122 that connects the base plate with the fixed plate, as shown in FIGS. 11-12. As shown in FIGS. 16-17, the top plate includes a beveled edge 122a near the cutline indicator 119 to provide a relief angle for alternative angular orientations of the saw blade. In one feature, the support fixture 111 permits adjustment of the width between the base plate 113 and the fixed plate 120. Thus, the fixture may include a width adjustment mechanism 123 as shown in FIGS. 11-15. In one embodiment the adjustment mechanism includes an extension rod 124 fixed to the base plate by a rod mount 126. The fixed plate 120 includes a rod collar 127 through which the adjustment rod 124 extends. An adjustment pin 128 projects through the collar 127 to intersect the rod therein.

The rod 124 includes a plurality of adjustment bores 125 sized to receive the adjustment pin. The width of the space between the base plate 113 and the fixed plate 120 can be adjusted from the maximum width shown in FIG. 13 to engage a workpiece W to the width shown in FIG. 18 to engage a narrower workpiece W". The adjustment pin 128 may be spring biased to hold the pin within an adjustment bore 125 until pulled outward by the operator. Other mechanisms for adjusting the spacing between the base plate and fixed plate may be contemplated.

In order to engage the workpiece, the fence assembly 112 includes a movable plate 130 that is disposed between the base plate and the fixed plate, as shown in FIGS. 11 and 18. The movable plate may have an angled edge 131 to facilitate placement of the support fixture on the workpiece W. A clamping mechanism 133 is provided to move the plate 130 toward the base plate 113 to clamp onto a workpiece. As shown in more detail in FIGS. 15 and 17, the clamping mechanism 133 includes a lead screw 134 that is mounted between the base plate and the fixed plate 120. A hub 135 is affixed to the movable plate 130 and defines a threaded bore 136 for engaging the lead screw. A gear train 138 is provided at one end of the lead screw to engage a drive gear 138. The drive gear is connected to a knob 139 to allow the operator to manually rotate the drive gear, and ultimately the lead screw, to move movable plate 130 toward the surface of the workpiece W (FIG. 13), W' (FIG. 14), or W" (FIG. 18). Other mechanisms for clamping a workpiece between the movable plate 130 and the base plate 113 may be contemplated.

A scale 142 may be provided in parallel with the lead screw 134 to provide a visual indication of the clamped width. One end of the scale 142 is fastened to the base plate by a scale mount 143 while the other end slides freely within an indicator hub 144 associated with the movable plate 130. The edge of the indicator hub aligns with the scale to provide the visual width indication.

Returning to FIGS. 11-12, the fixed plate 120 supports an elongated guide rail assembly 150 that defines a path for the tool across the workpiece. In one embodiment, the guide rail assembly 150 includes a pair of guide rods or guide rails 151, 152 supported at one end by a rod mount 154 and at the opposite end by an end cap 155. The rod mount and end cap are configured to maintain the guide rods in a generally parallel orientation, and are further configured to prevent any twisting of the rods relative to each other. The rod mount 154 is mounted to a miter plate 172 such as at mounting holes 183 (FIG. 22) so that the guide rail assembly 150 pivots with the miter plate as described herein.

The guide rail assembly 150 supports a carriage 160 for sliding movement along the length of the guide rods 151. In one embodiment, the carriage 160 defines a rod bore 161 configured to receive the rod 152 therethrough, as depicted in FIG. 12. A bushing or bearing component may be provided within the rod bore 161 to facilitate the sliding movement of the carriage along the rod 152. The carriage further defines a rod channel 162 that at least partially encircles the other guide rod 151 in a close running fit. The rod channel 162 may be provided with a bushing or a low friction surface to facilitate the sliding movement. The guide rail assembly may be provided with a stop (not shown) mounted to one or both of the guide rails 151, 152 to provide a positive stop for the carriage as it moves along the guide rails.

The carriage may be provided with a mounting bracket 165 for supporting a coiled band 164, similar to the band 33 in the previously described embodiment (see FIG. 2). One end of the band is fastened to the miter plate 172, such as at the band attachment pad 166 (FIG. 22). As the carriage 160 moves downward along the guide rail assembly 150 the band 164 uncoils from the mounting bracket 165 so that the depth of cut markings on the band are visible. The depth band 164 may be spring-biased, such as by a torsion spring between the band and the mounting bracket 165, to retract the coiled band and thereby provide a force to return the carriage 160 to its uppermost starting position on the guide rail assembly 150.

The carriage 160 carries a tool support plate 170 which is configured to support the tool T. The carriage allows the tool T to be translated downward along the guide rails 151, 152 to perform an operation on a workpiece. Thus, in the illustrated embodiment of FIGS. 11-12, the tool includes a saw blade S that can travel along the guide rail assembly to cut through a workpiece, such as workpiece W in FIG. 13. Moreover, it can be appreciated from FIG. 13 that the support fixture 111 supports the tool and saw blade S on the workpiece so that the operator can support the workpiece with one hand and convey the saw blade along the guide rail assembly with the other hand. One benefit of this attribute can be discerned from FIG. 13 in which the workpiece W has a thickness that is greater than the radius of the saw blade S, or more pertinently wider than the maximum depth of cut for the saw blade. In this instance, a first cut can be made in the workpiece, as shown in the figure, and then the support fixture 111 can be removed and repositioned on the workpiece to make the cut from the other side.

It should also be appreciated that the support fixture and guide rail assembly of this embodiment takes advantage of gravity to assist in propelling the saw blade S through the workpiece. Alternatively, the support fixture may be positioned as shown in FIG. 12 so that the saw blade S is moved horizontally through the workpiece in a conventional fashion.

The tool assembly 110 provides a mechanism for adjusting the angle of the tool T, and particularly the saw blade S, relative to the workpiece. Thus, in one aspect, the tool assembly includes the miter plate 172 that can be angularly adjusted relative to the fixed plate 120 of the support fixture 111. As seen in FIGS. 21-22, the miter plate includes an adjustment slot 173 that follows an arcuate path and a mounting slot 178 that is generally parallel to the adjustment slot and follows a similar arcuate path. Like the miter plate 40 described above, the miter plate 172 includes a scale 177 to indicate the angular orientation of the miter plate relative to the fixed plate 120.

As shown in the detailed view of FIG. 21, the miter plate 172 is mounted to the fixed plate 120 by a locking knob 174 configured to cooperate with a member 176 that passes through the adjustment slot 173, the member 176 engaging a blind slot 175 in the fixed plate 120. A mounting pin 180 passes through a blind slot 179 in the fixed plate 120 and through the mounting slot 178. A snap ring 181 engages the mounting pin 180 to hold the miter plate to the fixed plate. As with the miter plate 40, the miter plate 172 is configured to rotate about a virtual pivot point aligned with the cut line indicator 119 in the base plate 113. More particularly, the slots 173, 178 in the miter plate and the blind slots 175, 179 in the fixed plate 120 are arranged to permit orientation of the tool T at various miter angles, as shown in FIGS. 19-20. The combined length of the slots 173 and 175, for instance, allows the saw blade S to be oriented at opposite angular directions—one cutting away from the support fixture 111 (FIG. 19) and the other cutting toward the support fixture (FIG. 20). The relief angle 115 in the base plate and a similar relief angle 121 in the fixed plate 120 accommodate this reversed miter angle cut.

In addition to the miter angle capability, the tool assembly 110 may be provided with an additional angular adjustment perpendicular to the miter angle. This angular adjustment is particularly useful in making compound angle cuts, such as for a miter joint in an ornate wood trim, as depicted in FIG. 25. Thus, as shown in FIGS. 23-24, the tool assembly may include a perpendicular angle adjustment mechanism 184 associated with the tool support plate 170. The adjustment mechanism 184 includes an arcuate slot 185 defined through the tool support plate and an arcuate groove 186 defined in the plate 170 that is generally parallel to the arcuate slot. The tool T includes a plate 193 that is affixed to the housing H or gearbox G. The plate 193 carries a locking knob 188 that can engage a locking pin 189 extending through the arcuate slot 185. A guide pin 191 projects from the plate 193 into the groove 186. The angular orientation of the saw blade S may be adjusted in this perpendicular plane, as best shown in FIG. 23. As shown in FIG. 25, the saw blade S may thus be positioned at two perpendicular angles relative to the workpiece W''', which in the illustrated embodiment is an ornate molding, such as crown molding. The tool support plate 170 may be provided with angle markings to orient the plate 193 at a desired perpendicular angle.

It should be appreciated that the tool assembly 10 and 110 may be used to support a variety of tools. One primary tool is the rotary saw and saw blade S described above. Alternatively, as shown in FIG. 26, the tool may include a router bit R. The tool assembly can be used to draw the router bit in a linear path and at various angular orientations across a surface of a workpiece. It can be further contemplated that the guide rail assemblies 15 and 150 described herein may be modified to allow the router tool to follow a non-linear path. For instance, the guide rods 151, 152 may be curved so that the router may cut a curved groove in a workpiece.

The tool T may be supported by a carrier C mounted to the support plate 170 of plate 193. The carrier C may be configured to allow adjustment of the tool T along its longitudinal axis, such as to adjust the depth of cut of the router bit R. In addition, the mounting plate supporting the carrier C may be configured like the plate 193' shown in FIG. 27 so that the router bit R has an initial position immediately adjacent the base plate so that the bit can perform a cut across the entire width of the workpiece.

In a further modification, the guide rail assembly may be modified as the assembly 150' shown in FIGS. 27-28 to allow the assembly to pivot in a direction orthogonal to the other angular adjustments. With this modification, the rod mount 154' of the guide rail assembly 150' includes a mounting collar 198 that rotatably engages a clevis mount 197 on the miter plate 172. An adjustment knob 199 may be provided to loosen or tighten the engagement between the clevis mount and collar. This adjustment feature allows the guide rail assembly 150' to be arranged perpendicular to the fence assembly and therefore to the upper edge of the workpiece, as illustrated in FIG. 27. This feature can be particularly useful for the router tool bit R to cut a groove in an edge of a workpiece, although it can also be implemented where the tool is a rotary saw.

The tool assemblies 10 and 110 described herein provide a compact and light weight tool that can be quickly deployed to make accurate cuts in a workpiece. The virtual pivot feature for the miter plates 40 and 172 ensures that when the tool or saw blade S is rotated at a particular miter angle the blade is always centered relative to the cut line. Moreover, the virtual pivot feature ensures that the depth of cut is the same regardless of the angular orientation of the saw blade.

The fence assemblies 12, 112 allow the corresponding tool assemblies to be readily mounted on virtually any workpiece, whether the workpiece stands alone, is supported in a clamp or jig or part of an existing structure. The configuration of the fence assemblies allows the operator to quickly align the cut line indicators 50, 119 with a cut line marking on the workpiece, clamp the assembly onto the workpiece and commence the cut. Moreover, since the tool is guided along a guide rail assembly 15, 150 there is no need for the operator to try to follow a cut line drawn across the entire workpiece. This feature can be particularly valuable when making mitered cuts since the support fixture supports the tool along its entire travel, rather than the operator having to guide the tool with a steady hand along an angled cut line drawn on the workpiece. The miter feature of the tool assemblies disclosed herein eliminates the need for protractors, guides or other attachments to define the miter cut angle. The operator need only adjust the angle of the miter plate 40, 172 using the corresponding angle indicators 47, 177.

The tool assembly 110 disclosed herein also permit orienting the saw blade at a plus or minus miter angle relative to the cut line. In the illustrated embodiments, the saw blade S can be oriented from 0 to +60° (i.e., tilted away from the support fixture as depicted in FIG. 19) and from 0 to −60° (i.e., tilted toward the support fixture as depicted in FIG. 20). This capability is particular advantageous in making miter cuts on workpieces that have a "finished" side. It is known that a rotating blade can produce splintering or jagged edges in the direction of the blade rotation. For an unfinished workpiece the cut can be sanded to remove any defects. However, for a finished piece it is often not possible to sand the cut edge without marring the finish. In these instances, performing the cut from the unfinished side of the workpiece limits the defects to the unfinished side, leaving the finished surface blemish free. When making a straight cut it is thus a simple matter of turning the workpiece over and making the cut. However, when the cut is to be made at a miter angle, turning the piece over results in the miter cut being made in the wrong direction. In this instance the tool assembly 110 allows the saw blade to be tilted to the negative miter angle. In particular, the arcuate slots in the fixed plate (175, 179) and in the miter plate (173, 178) combine to produce the full sweep of miter angles. This "dual miter" feature can also be useful when making miter cuts at the end of a workpiece when it is desired to clamp one side of the workpiece. The miter angle can be adjusted plus or minus so that the scrap workpiece material is on the side of the saw blade facing away from the fence assembly 112.

The tool assemblies disclosed herein allow cuts to be made at perpendicular or orthogonal angles, either individually or in combination. For instance, the angular adjustment 184 of the tool relative to the tool support plate 170 can be made independent of any adjustment of miter angle. The saw may thus be used to make a bevel cut in the end of a workpiece.

The combination of the guide rails and the fence assemblies of the tool assemblies 10 and 110 allow cuts to be made in a workpiece with minimal effort. One disadvantage of more traditional processes is that the workpiece is positioned horizontally and the cut is made horizontally across the span of the workpiece. For a typical circular saw, the tool is supported on the workpiece by a foot plate, which means that the foot plate adds friction as the tool is pushed across the surface of the workpiece. The support fixtures of the present tool assemblies take advantage of gravity to assist in making a vertical cut through the workpiece.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed is:

1. A tool assembly comprising:
a tool having a working end configured to perform a cutting operation on a workpiece; and
a support fixture for supporting said tool on the workpiece, said support fixture including:
a clamping assembly configured for clamping onto the workpiece,
a miter plate pivotably mounted on said clamping assembly to permit pivoting of said miter plate to variable angular orientations relative to said clamping assembly,
a guide rail assembly mounted on said miter plate and including an elongated member defining a travel path of said tool and a cutting path of said working end corresponding to a line of cut of said working end of said tool for extending across the workpiece, the line of cut spaced from the elongated member and the travel path,
a carriage slidably supported on said elongated member, and
a tool mount carried by said carriage and supporting said tool,
wherein said miter plate pivots about a virtual pivot located at a virtual pivot point defined on said line of cut such that said line of cut extends through said virtual pivot and said virtual pivot point, and
wherein said miter plate is mounted to said clamping assembly at a mounting location that is spaced from said virtual pivot point.

2. The tool assembly of claim 1, wherein said elongated member of said guide rail assembly is provided with distance markings indicative of a distance of travel of said carriage along said elongated member.

3. The tool assembly of claim 1, wherein:
said elongated member is a guide rail defining a track on opposite sides of said guide rail and extending along at least a portion of the length thereof; and
said carriage includes rollers disposed within said track on each of said opposite sides of said guide rail.

4. The tool assembly of claim 1, wherein said guide rail assembly includes a stop adjustably mounted on said elongated member and configured to prevent movement of said carriage beyond said stop.

5. The tool assembly of claim 1, wherein:
said elongated member includes an elongated rod; and
said carriage defines a bore therethrough that slidably receives said elongated rod.

6. The tool assembly of claim 1, further comprising a coiled elongated band having one end mounted to said carriage and the opposite end fixed, relative to said carriage, on said support fixture, said elongated band including distance markings indicative of a distance of travel of said carriage relative to said elongated member of said guide rail assembly, said coiled elongated band configured to uncoil as said carriage travels away from one end of said elongated member.

7. The tool assembly of claim 6, wherein said coiled elongated band is biased to a coiled condition.

8. The tool assembly of claim 1, wherein said clamping assembly includes a line of cut indicator at said virtual pivot point.

9. The tool assembly of claim 8, wherein said miter plate includes two arcuate slots, said arcuate slots radially offset from each other relative to said virtual pivot point; and
wherein said mounting location includes:
a first mounting location including a mounting pin passing through one of said arcuate slots that is radially closer to said virtual pivot point and connected to said clamping assembly; and
a second mounting location including a locking member passing through the other of said arcuate slots and connected to said clamping assembly, said locking member configured to selectively lock said miter plate to said clamping assembly.

10. The tool assembly of claim 9, wherein said mounting pin and said locking member are connected to said clamping assembly at fixed locations thereon to define said first and second mounting locations.

11. The tool assembly of claim 9, wherein:
said clamping assembly includes a base plate and a fixed plate spaced apart from said base plate to receive the workpiece therebetween, said fixed plate defining two arcuate slots aligned with said arcuate slots of said miter plate; and
said mounting pin and said locking member pass through an aligned one of said arcuate slots in said fixed plate to define said first and second mounting locations.

12. The tool assembly of claim 9, wherein said second mounting location is offset from said guide rail assembly.

13. The tool assembly of claim 1, wherein said clamping assembly comprises a top plate having a surface for receiving an edge of the workpiece thereagainst; and
wherein said variable angular orientations include a perpendicular angle, in which said elongated member is perpendicular to a plane of said surface of said top plate, and other angles that are less than and greater than said perpendicular angle.

14. The tool assembly of claim 1, wherein said tool mount includes a tool support plate pivotably mounted to said carriage to pivot in a plane orthogonal to a pivot plane of said miter plate.

15. The tool assembly of claim 1, wherein said clamping assembly includes a U-shaped body configured to be received on an edge of the workpiece, and a clamping element for clamping the U-shaped body to the workpiece.

16. The tool assembly of claim 1, wherein:
said clamping assembly includes a base plate and a fixed plate spaced apart from said base plate to receive the workpiece therein; and
said guide rail assembly is mounted on said base plate.

17. The tool assembly of claim 16, wherein said clamping assembly further includes:
a movable plate disposed between said base plate and said fixed plate; and
a clamping mechanism operatively attached to said movable plate for driving said movable plate toward said fixed plate to clamp the workpiece therebetween.

18. The tool assembly of claim 16, wherein said fixed plate includes feet for supporting said tool assembly on a surface with the workpiece supported in the clamping assembly.

* * * * *